United States Patent
Pilcher, Jr. et al.

(10) Patent No.: US 7,504,992 B2
(45) Date of Patent: Mar. 17, 2009

(54) WIRELESS SYSTEM USING CONTINUOUS WAVE PHASE MEASUREMENT FOR HIGH-PRECISION DISTANCE MEASUREMENT

(75) Inventors: Michael Eugene Pilcher, Jr., Helotes, TX (US); Brian Earl Campion, San Antonio, TX (US); Ben Allen Abbott, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 76 days.

(21) Appl. No.: 11/832,493

(22) Filed: Aug. 1, 2007

(65) Prior Publication Data

US 2009/0033545 A1 Feb. 5, 2009

(51) Int. Cl.
- *G01S 13/08* (2006.01)
- *G01S 13/32* (2006.01)
- *G01S 13/74* (2006.01)
- *G01S 13/88* (2006.01)
- *G01S 13/00* (2006.01)
- *G01S 7/40* (2006.01)

(52) U.S. Cl. .......... 342/125; 342/42; 342/43; 342/50; 342/51; 342/59; 342/60; 342/118; 342/175; 342/195; 342/450; 342/451; 342/463; 342/464; 342/465

(58) Field of Classification Search ........ 342/42–51, 342/58–60, 104–147, 165, 173–175, 195, 342/450–465; 367/2–6, 14, 58, 117
See application file for complete search history.

(56) References Cited

U.S. PATENT DOCUMENTS

| | | | |
|---|---|---|---|
| 2,864,943 A * | 12/1958 | Schultz | 342/50 |
| 3,432,851 A * | 3/1969 | Cox, Jr. et al. | 367/6 |
| 3,438,032 A | 4/1969 | Cook | |
| 4,042,906 A * | 8/1977 | Ezell | 342/50 |
| 4,086,504 A * | 4/1978 | Ezell et al. | 342/50 |
| 4,812,035 A | 3/1989 | Freedman et al. | |
| 4,833,480 A | 5/1989 | Palmer et al. | 342/125 |
| 5,164,985 A | 11/1992 | Nysen et al. | |
| 5,914,683 A | 6/1999 | O'Conner | 342/127 |
| 5,955,991 A | 9/1999 | Kawakubo | 342/374 |
| 6,225,941 B1 | 5/2001 | Gogineni et al. | 342/22 |
| 6,445,193 B1 | 9/2002 | Trummer et al. | 324/644 |
| 6,492,933 B1 | 12/2002 | McEwan | 342/28 |
| 6,868,073 B1 | 3/2005 | Carrender | |
| 6,940,347 B2 | 9/2005 | Cheer | |
| 6,946,949 B2 | 9/2005 | Heide et al. | |
| 6,963,301 B2 | 11/2005 | Schantz et al. | 342/125 |
| 7,013,991 B2 | 3/2006 | Wilson-Langman et al. | |

(Continued)

FOREIGN PATENT DOCUMENTS

WO 2006130004 A1 12/2006

*Primary Examiner*—Bernarr E Gregory
(74) *Attorney, Agent, or Firm*—Baker Botts LLP

(57) ABSTRACT

A system and method for monitoring topological changes in a defined area. A grid of sensors is arranged in the area, with known distances between them. The sensors communicate wirelessly with a host computer, which individually addresses each sensor to instruct that sensor to be in an interrogate mode or responder mode. When a sensor is in interrogate mode, it measures distance from a neighboring sensor using radar (continuous wave phase difference) measurements. When a sensor is in responder mode, it receives, delays, and returns a signal received from a neighboring sensor.

16 Claims, 7 Drawing Sheets

U.S. PATENT DOCUMENTS

| | | |
|---|---|---|
| 7,023,356 B2 | 4/2006 | Burkhardt et al. |
| 7,030,761 B2 | 4/2006 | Bridgelall et al. |
| 7,038,614 B1 | 5/2006 | Aker .......................... 342/70 |
| 7,119,736 B2 | 10/2006 | Heide et al. ................. 342/125 |
| 7,139,581 B2 | 11/2006 | Berliner et al. |
| 2004/0032363 A1* | 2/2004 | Schantz et al. .............. 342/127 |

* cited by examiner

# WIRELESS SYSTEM USING CONTINUOUS WAVE PHASE MEASUREMENT FOR HIGH-PRECISION DISTANCE MEASUREMENT

TECHNICAL FIELD OF THE INVENTION

This invention relates to distance measurement, and more particularly to using continuous wave phase measurement for such applications.

BACKGROUND OF THE INVENTION

Measurement of distance has been implemented with many different techniques, whose relative merits can be evaluated only within specific applications. For applications that preclude direct physical measurement, techniques based on time-of-flight of electromagnetic (EM) waves are often used.

One type of EM-based system uses microwaves, as implemented by surveying instruments known as Tellurometers. These instruments precisely measure ground distances by determining the velocity of a phase-modulated, continuous microwave radio signal transmitted between two instruments operating alternately as master station and remote station.

One application in which EM-based technology has been applied is that of distance measurement for topological monitoring. Many natural hazards (landslides, mud-flows, volcanic eruptions, floods, glacial surges) develop with time scales that are too short and conditions that are too dangerous for traditional field deployment. In such environments, networks of inexpensive and expendable wireless nodes have been developed to collect location information. The fusion of this new technology with evolved technologies such as high precision Global Positioning System (GPS), and other developing technologies such as Interferometric Synthetic Aperture Radar (InSAR), provide an opportunity to gather more data, more rapidly, in more hostile environments than ever before.

Although various wireless sensor node distance measurement techniques have been proposed, none approach the accuracy required for natural hazard prediction, assessment and mitigation.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

As stated in the Background, EM-based distance measurement instruments have been previously implemented using phase difference measurements between separate frequency continuous EM wave returns. In EM-based distance measuring systems generally, distance is derived from the time it takes for a signal to be propagated along a propagation path corresponding in length to the distance to be measured. In continuous wave systems, as opposed to pulse systems, the signal is a sine wave signal of known frequency, and the travel time is measured by determining the phase delay experienced by the signal in being propagated along the propagation path.

Thus, by knowing the phase delay and the wavelength of the sine wave resulting from propagation of the signal, the distance can be determined. To determine the phase delay, the phase of the signal before propagation is compared with the phase of the signal after propagation. This results in a phase measurement which represents only the fractional part of the phase delay. In other words, although a phase measurement at a particular frequency can be used to resolve the phase delay to a fraction of a whole phase rotation, it cannot be used to resolve the number (if any) of whole phase rotations.

Performing continuous wave (CW) phase measurement in a wireless environment has unique challenges. Although wireless sensor circuitry with CW phase measurement components allows ranging with sub-centimeter resolution, practical limits of power and oscillator synchronization pose significant challenges to implementation of precision CW based systems.

Figure 1:
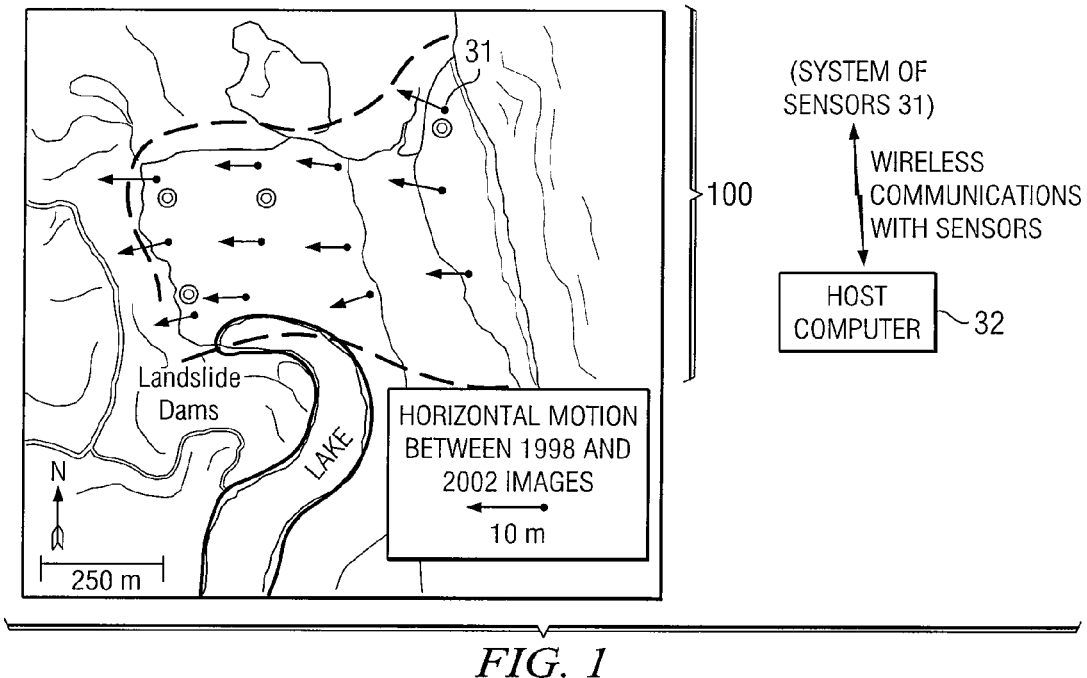
FIG. 1 illustrates a distance measurement system comprising a network of sensors, which each communicate wirelessly with a host computer.

FIG. 1 illustrates a network of sensors 31, which each communicate wirelessly with a host computer 32. In the example of FIG. 1, twelve sensors 31 have been placed on a landslide area. Sensors 31 and host computer 32 comprises a distance measurement system in accordance with one embodiment of the invention. The arrows indicate motion over time, as measured by sensors 31. As explained below, this description is directed to a system and method for CW phase measurement that are not limited by power and oscillator difficulties.

Figure 2:
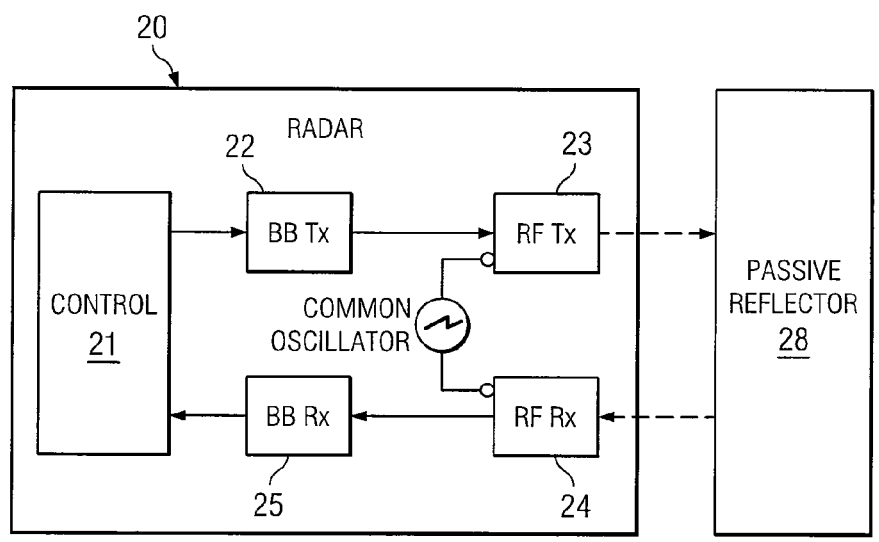
FIG. 2 illustrates a conventional radar device.

FIG. 2 illustrates a conventional radar system 20. When a distance measurement is desired, transmission of radio frequency (RF) energy is initiated by the control unit 21. The base-band transmitter (BB Tx) 22 creates a waveform that is transmitted by the radio frequency transmitter (RF Tx) 23, and ultimately detected by the base-band receiver (BB Rx) 25. The RF receiver (RF Rx) 24 recovers the energy that is reflected by the passive object whose distance is to be measured and passes it on to the BB Rx 25 for time of flight comparison. The control unit 21 determines the distance by measuring the roundtrip time of flight of the RF energy.

Many techniques can be used for time-of-flight measurement, but a core issue for practical realization of system 20 is the need for oscillator synchronization. For this reason, all radars use some method (e.g., single oscillator or phase lock) to synchronize their oscillators. Although expensive with respect to the amount of RF energy required to acquire a reflection, the passive nature of the reflector aids in oscillator synchronization.

If the reflector were to be an active, cooperative portion of the system, all its oscillators would require synchronization. High accuracy synchronization of distributed oscillators is a difficult problem.

Figure 3:
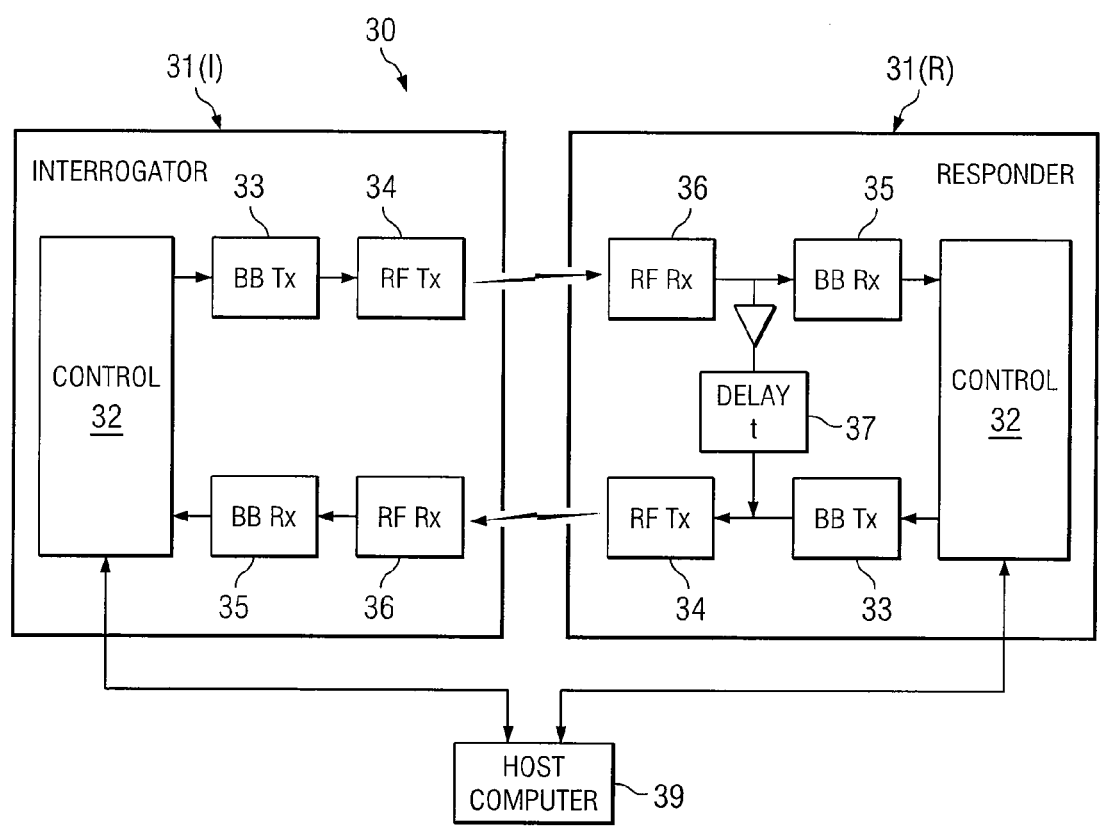
FIG. 3 illustrates two sensors of a system like the system of FIG. 1, one acting as interrogator and the other acting as responder.

FIG. 3 illustrates a system 30 in accordance with the invention, which has an active reflector 31(R), but does not require distributed oscillator synchronization. This is accomplished by sending a pulse from the transmitter (interrogator) 31(I) and using a "delay line" at the reflector (responder) 31(R) to avoid sending it back too early (i.e., during the transmit pulse, before the receiver is activated).

More specifically, system 30 has two sensor modules 31, each of which may act as either an interrogator or responder. In the example of FIG. 3, sensor 31(I) is operating as the interrogator and sensor 31(R) is operating as a responder.

For each sensor 31, the major components are the wireless control unit 32, base-band transmitter (BB Tx) 33, RF transmitter (RF Tx) 34, base-band receiver (BB Rx) 35, and RF receiver (RF Rx) 36. When a sensor 31 is operating as a responder, delay path 37 is used.

At responder 31(R), using amplifier 37*a* and delay circuit 37*b*, the return signal path is amplified and delayed to separate the response signal from any natural radar reflections which occur as the transmitted energy reflects off the sensor enclosure or other objects near the responder. Examples of a suitable delay are 0.1 microseconds or 100 feet. The amplification also helps counter multi-path effects by ensuring that the response signal dominates other reflections from the environment.

Referring again to FIG. 1, a network of sensors 31 is positioned in an area of interest. Once the sensor network is in place, distance measurement between individual sensors 31 can begin. For distance measurement, each sensor 31 relies on measuring and comparing the phase of successive returns from a neighboring sensor 31. These measurements provide a timeline of relative distance changes between sensors 31. However, for these relative measurements to translate into absolute distances, the system must be initialized with known inter-sensor distances.

Two design requirements are necessary to achieve and use an initialization baseline collected at system startup: (1) the ability to properly calibrate the system for the turnaround time from responders, and (2) the repeatability of the turnaround time. To address the first requirement, each sensor 31 is equipped with sufficient computing and storage capability to perform phase measurement, burst averaging, and range comparison. To meet the second requirement, the delay path 37 is designed to be stable and reliable over time. Avoiding base-band processing and tapping the system at intermediate frequency (IF) provides turnaround repeatability within the picoseconds level.

The rough accuracy of system 100 is brought below the carrier wavelength (about 12.5 cm at 2.4 Gigahertz) using a pulse burst initialization process. Then, the sensors transition into a CW mode of operation. This mode provides the fine range accuracy achieved by using phase measurement to compare the phase of the transmitted and received CW signals. Conservatively, assuming 15 degrees of phase comparator error, the resulting distance accuracy is 0.52 cm.

Distance monitoring and collection software runs continuously on each sensor 31. This software collects data and re-verifies position in a periodic fashion. The collected data is transmitted to a host computer 30 where it is collated and displayed.

Figure 4A:
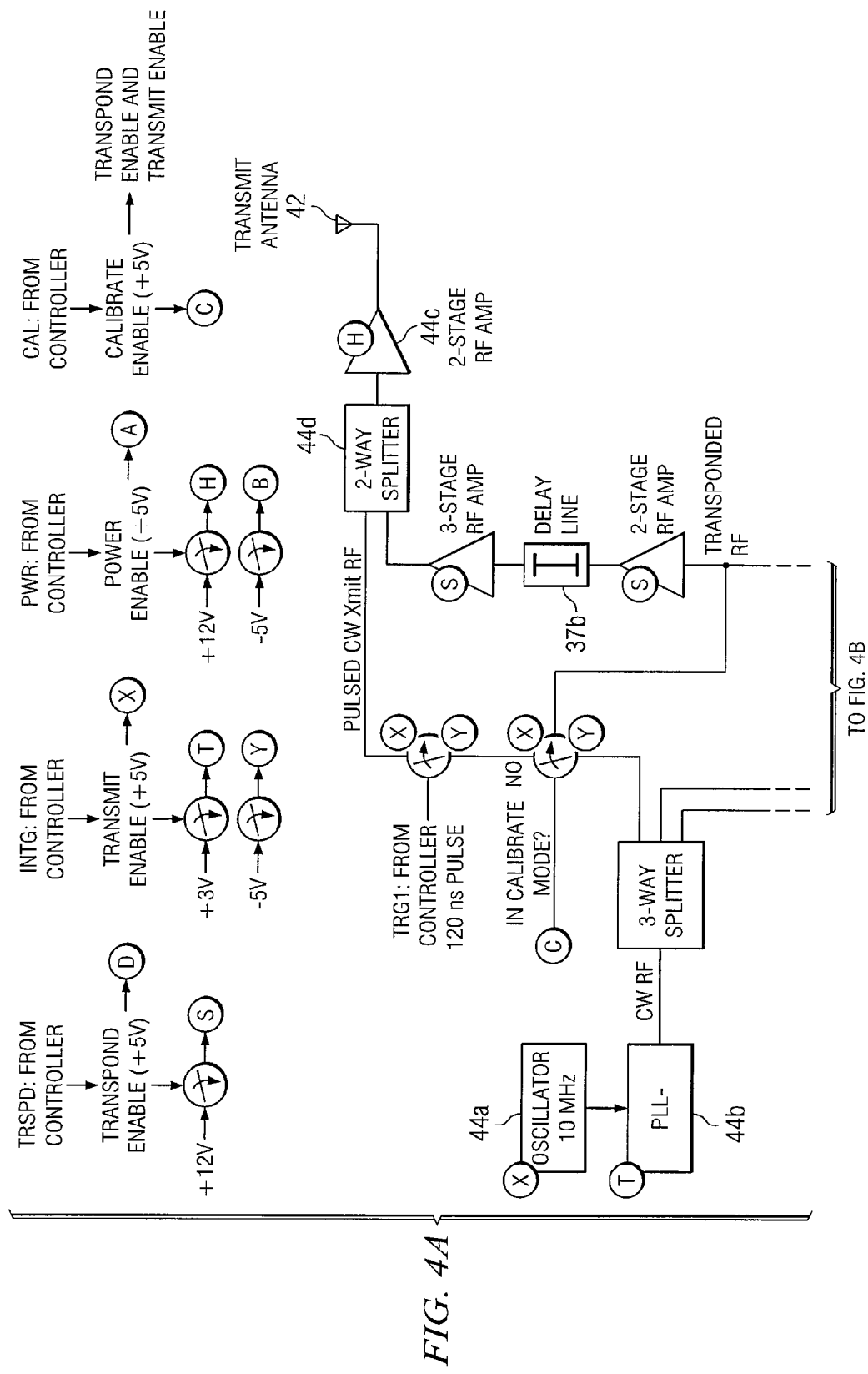
FIG. 4 illustrates on of the sensors of FIG. 3 in further detail.
Figure 4B:
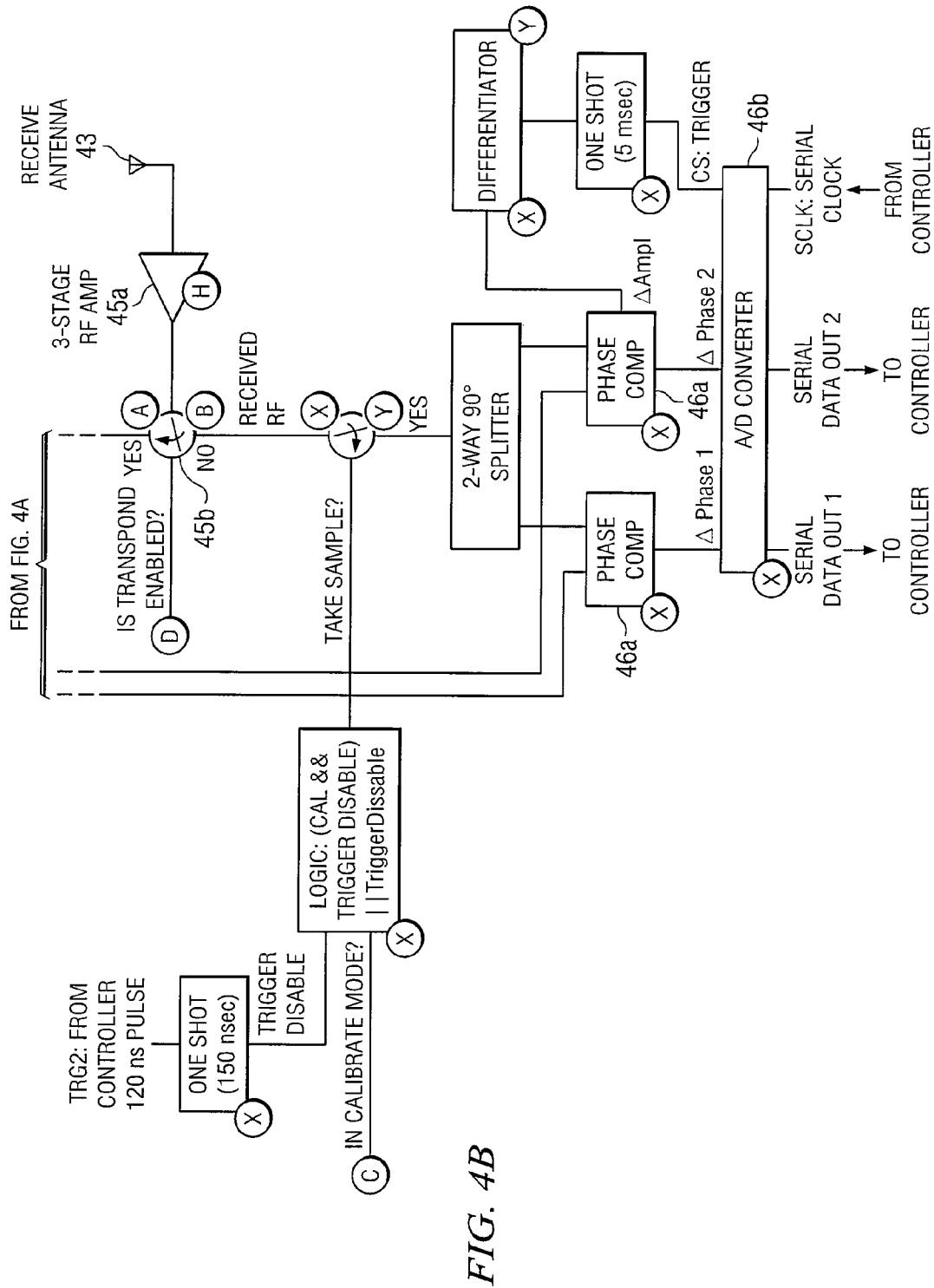

FIG. 4 illustrates a sensor 31 in further detail. Each sensor's control unit 31 may select one of three operating modes: interrogate (measure distance to a responder); transponder (work as a responder); and calibrate (measure any inaccuracy and drift in the delay line and other components).

Figure 5:
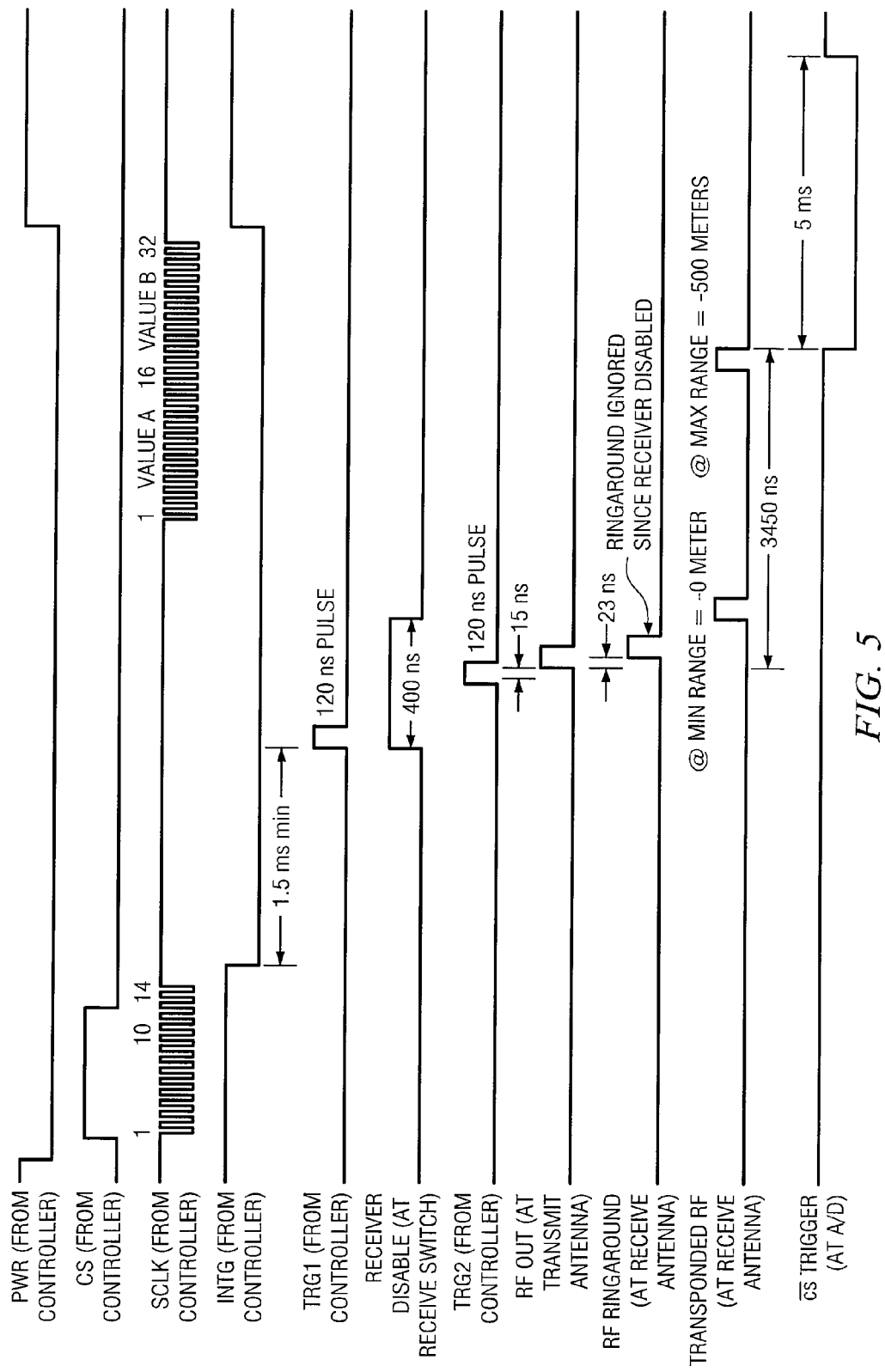
FIG. 5 is a timing diagram of the interrogate mode of a sensor.
Figure 6:
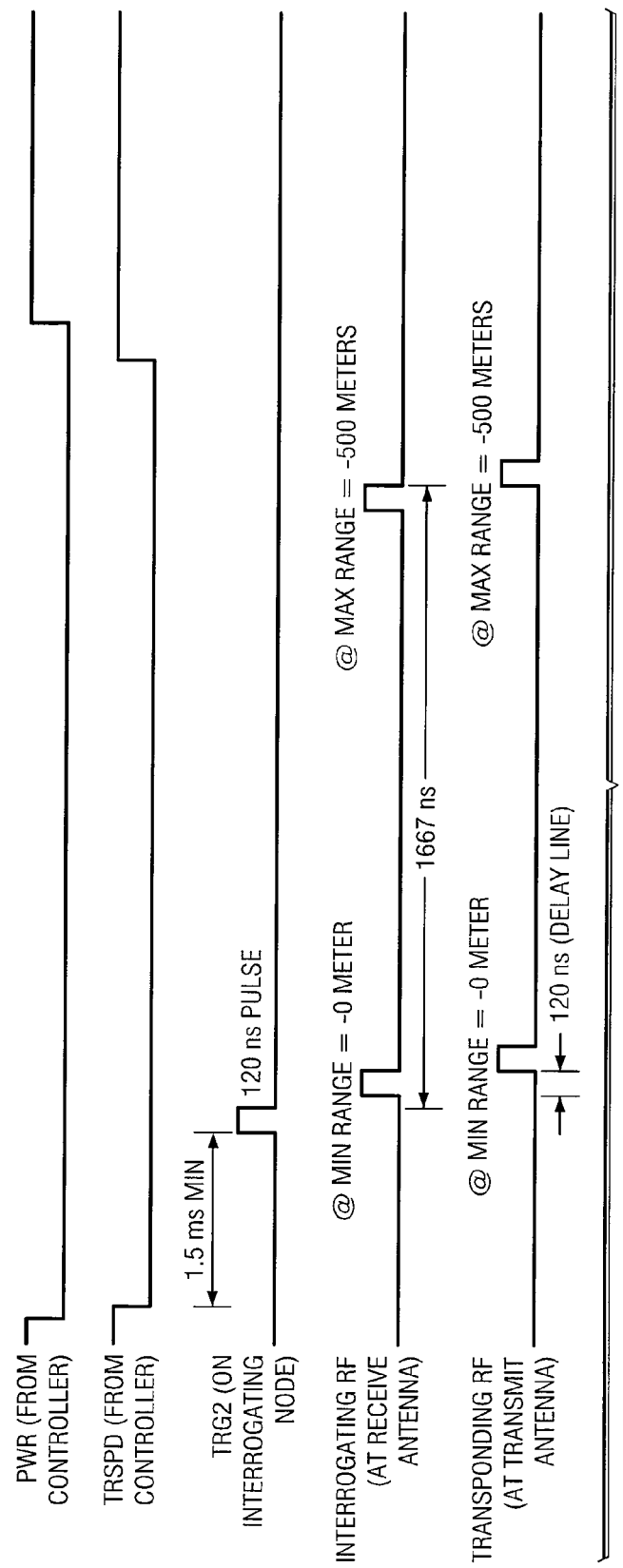
FIG. 6 is a timing diagram of the transponder mode of a sensor.
Figure 7:
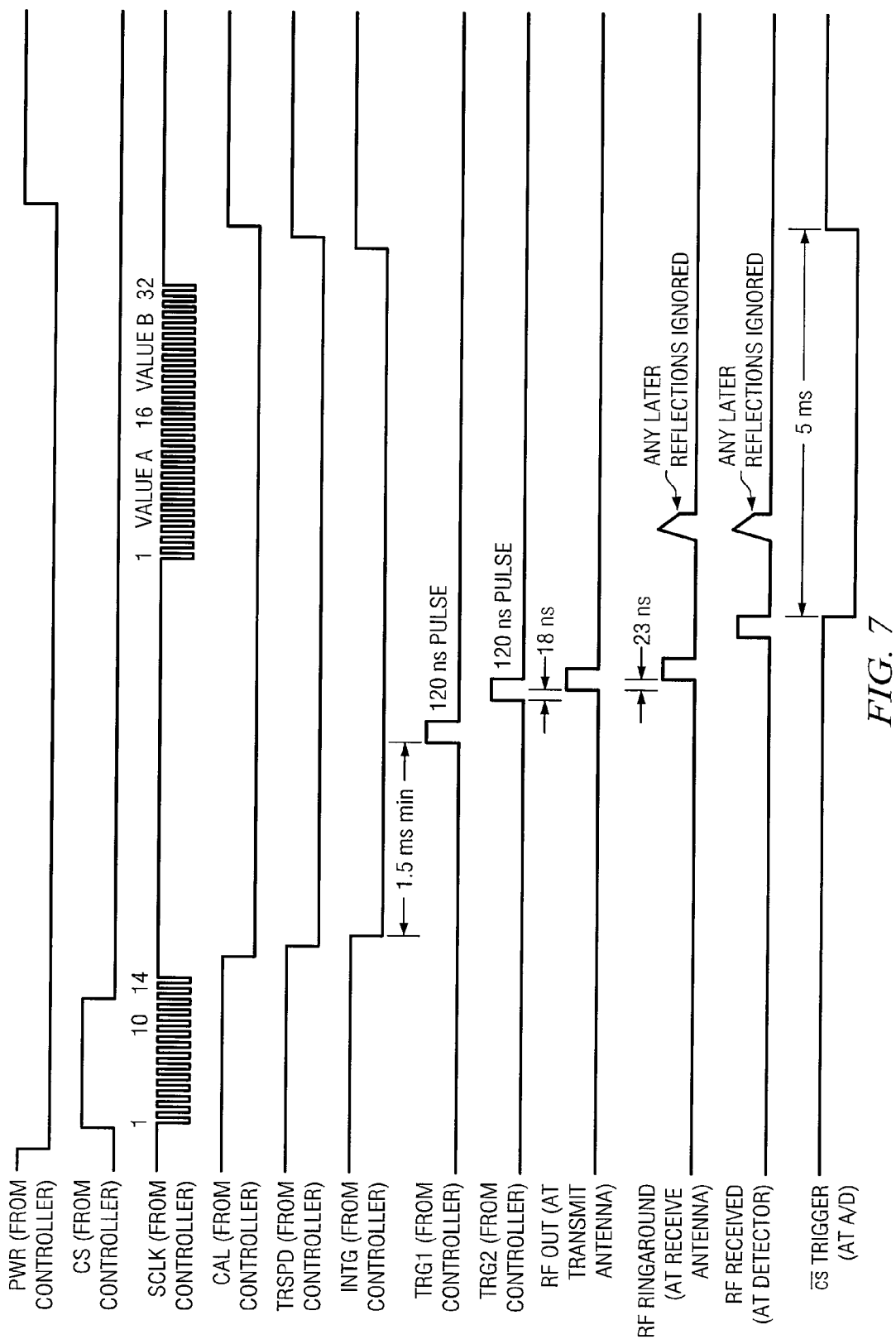
FIG. 7 is a timing diagram of the calibrate mode of a sensor.

FIGS. 5-7 are timing diagrams for each mode. These timing diagrams provide one approach to understanding the method of the invention.

FIG. 5 illustrates the timing for the interrogate mode, which proceeds as follows:

1. The control units 31 use their data network communication capability to coordinate one interrogator and one transponder. The data network of the wireless sensors is used to accomplish this coordination.
2. The continuous wave phase measurement apparatus is turned on. This is accomplished by the control unit 31 lowering the voltage level on the power pin (PWR).
3. The control unit 31 clears any existing data out of the analog to digital (A/D) converter 46*b* by selecting it (the CS line is toggled) and then clocking out the bits. The SCLK line is toggled repeatedly while reading the data pin of the A/D.
4. The sensor is put into interrogate mode by lowering the INTG pin.
5. The control unit toggles the TRG1 pin which in turn causes the receiver to be disabled for about 400 nanoseconds. In this way, the RF pulse going out to the transponder does not trigger the interrogator's detection while initially being propagated.
6. The control unit 31 toggles the TRG2 line which in turn causes an RF signal to be propagated out the transmit antenna 42.
7. Ring around is ignored until the 400 nanoseconds of receiver disable expire.
8. A received pulse (from the transponder) triggers logic to toggle the A/D sample line (CS).
9. The control unit 31 reads the A/D bits clocking them out with the SCLK line.
10. The A/D value is a phase reading. A 90-degree shifted version of the phase value is duplicated to avoid noisy phase-null areas.

FIG. 6 illustrates the timing for the transponder mode, which proceeds as follows:

1. The control units 31 use their data network communication capability to coordinate one interrogator and one transponder. The data network of the wireless sensors is used to accomplish this coordination.
2. The continuous wave phase measurement apparatus is turned on. This is accomplished by the control unit 31 lowering the voltage level on the power pin (PWR).
3. The sensor is put into transponder mode by lowering the TRSPD pin.
4. RF energy on the receive antenna 43 is continuously routed through the delay line 37 out to the transmit antenna 42 at a delayed time period.

FIG. 7 illustrates the timing for the calibrate mode, which proceeds as follows:

1. The control unit 31 chooses when to run calibrate (typically after any measurement).
2. The continuous wave phase measurement circuitry is turned on. This is accomplished by the wireless sensor node control processor lowering the voltage level on the power pin (PWR).
3. The control unit clears any existing data out of A/D converter by selecting it (the CS line is toggled) and then clocking out the bits (the SCLK line is toggled repeatedly while reading the data pin of the A/D).
4. The sensor is put into calibrate mode by lowering the CAL pin.
5. The control unit toggles the TRG1 pin and then the TRG2 pin, which sets up sending and receiving the RF pulse through the delay line 37 while ignoring ring around.
6. A received pulse triggers logic to toggle the A/D sample line (CS).
7. The control unit then reads the A/D bits clocking them out with the SCLK line.

Other elements of FIG. 4 correspond to the elements of FIG. 3. Transmitter elements include an oscillator 44a, phase lock loop 44b, and amplifier 44c. A splitter 44d is used to determine whether an interrogation signal or delayed responder signal is transmitted from antenna 42. Receiver elements include an amplifier 45a and logic 45b for directing the signal to the delay line or measurement logic. The measurement logic (part of control unit 32) includes phase comparators 46a and an analog to digital converter 46b.

As compared to other radar devices, sensors 31 are not only miniaturized but must operate within a restricted RF design space as identified by current wireless design standards. Specifically, the wireless RF design environment dictates:

Omni-directional antennas

Single, relatively low carrier frequencies (2.4 GHz)

Low power (<1 mW)

Low bandwidth (750 kHz)

Each of these constraints is addressed by the design of system 100 as described below.

Antenna Considerations:

In order to process, analyze, and display returns from separate targets, radars must be able to isolate and distinguish each potential target. This isolation is typically accomplished by scanning highly directive antenna beams over fixed areas of space. Targets can be temporally separated because, for any given time, the radar's antenna is known to be oriented in a specific direction. This technique provides a high degree of separation, even in a target (or emission) dense environment.

A Tellurometer radar is even more dependent on adequate target separation than a more conventional pulsed radar. Specifically, a two-frequency CW radar is essentially a single-target radar because only one phase difference can be measured at a time. If more than one target is present, the echo signal becomes complicated and the meaning of the phase measurement is doubtful.

Omni-directional antennas, such as those typically used in wireless applications, provide no natural separation. Signals are received by omni-directional antennas simultaneously from all directions, and it is impossible to know from which direction any given signal has been received. Similarly, when an omni-directional antenna transmits, its energy is spread evenly in all directions. There is no method of knowing where to focus the transmitted energy for a given target because, again, there is no knowledge of the angle of arrival (AOA) of any specific target reflection.

The application for system 100 is not typical for radar. The wireless range monitoring system 100 consists of a spatial grid of cooperating sensors 31. Each sensor 31 can serve, at any given time, as a transmitter or as a cooperative "target". The transmit/receive schedules for each sensor are propagated throughout the system 100 via a specific wireless communication schema. Via this schema, each sensor 31 coordinates transmit/receive intervals with its neighboring sensors. In this manner, for any given transmitting sensor, only a single active "target" is expected to respond during a specific time interval. To summarize, identification, separation, and isolation of targets is made possible by individually controlling each sensor's viewing environment through wireless communications.

Frequency Considerations:

To translate into reliable distance measurements, phase angle differences are measured relative to known distances. For radar applications, target distances are generally unknown, so single phase measurements are ambiguous. To combat this range ambiguity, Tellurometers operate at two or more carrier frequencies and compare the phase measurements from each frequency. The unambiguous accuracy of Tellurometers is limited from the carrier frequency difference as:

$$Runamb = c/(2|f1-f2|)$$

The wireless carrier frequency band is fairly narrow. The 802.15.4 (wireless LAN) standard is one example of a suitable carrier frequency, and provides a range of 2400-2483.5 MHz. Even if the two extremes of the band were used, the minimum unambiguous range accuracy would only be around 1.8 meters using the Tellurometer approach.

To solve this problem, system 100 uses a priori knowledge of sensor-to-target distances. As long as the a priori measurement is accurate to within one-half of the carrier wavelength (approximately 12 cm at 2.4 GHz), phase differences can be measured relative to this known distance. System 100 is "seeded" with these a priori sensor spacings at system initialization. After that, the sensors track and maintain accurate inter-sensor distances. In applications where inter-sensor distances are expected to change rapidly, the time interval between successive sensor measurements can be adjusted to ensure that there is practically no likelihood of more than one-half wavelength change between measurements.

Power Considerations:

Radars are traditionally high-power systems. Even Tellurometers, which are relatively low power radars, have transmitter output powers of hundreds of milliwatts (e.g., the MRB 201 Tellurometer has a transmit power of 200 mW). Radars also have highly directive antennas which boost their Effective Radiated Power (ERP) by additional tens of dB. In contrast, wireless transmitters are restricted to less than 1 mW of output power and use omni-directional antennas with usually less than 5 dB of gain. Thus, a key design element is the distribution and spacing of the sensors 31 in a grid such that neighboring sensors are within the detection radius of the interrogating sensor.

In sum, system 100 has several notable features. Active, cooperative responders (reflectors) are used to form a "radar-like" measurement with an extremely large radar return. No oscillators are used in the responder. This avoids the problems associated with oscillator synchronization. Self-calibration is used to deal with temperature/component variations. A single, shared frequency used by all units.

What is claimed is:

1. A system for monitoring relative movement of a surface area, comprising:

a host computer;

a grid of sensors at known distances from each other, spaced within the surface area;

wherein the host computer is operable to wirelessly and individually instruct each sensor to operate in an interrogator mode or a responder mode;

wherein each sensor has radar circuitry for sending and receiving a continuous wave signal, such that it may send the signal to, and receive the signal back from, a neighboring sensor, when the former sensor is in interrogate mode;

wherein each sensor has delay circuitry for delaying and returning a signal received from a neighboring sensor, when the former sensor is in responder mode;

wherein each sensor has control circuitry for determining whether the sensor is in interrogator or responder mode and for calculating phase difference measurements of a returned signal.

2. The system of claim 1, wherein each sensor has an omni-directional antenna.

3. The system of claim 1, wherein the known distances are known to within one-half of the wavelength of the continuous wave.

4. The system of claim 1, wherein the control unit of each sensor is further operable to transmit distance measurement data to the host computer.

5. The system of claim 1, wherein each sensor further has initialization circuitry for using a pulse burst radar process to determine the inter-sensor distances with an accuracy of less than the carrier wavelength.

6. The system of claim 1, wherein the host computer and sensors wirelessly communicate using a wireless LAN communications standard.

7. The system of claim 1, wherein the inter-sensor spacing is sufficiently close such that they are operational at 1 mW of power of less.

8. The system of claim 1, wherein the host computer and sensors are operational at a single carrier frequency.

9. A method of monitoring relative movement of a surface area, comprising:
   placing a grid of sensors at known distances from each other, spaced within the defined area;
   using a host computer to wirelessly and individually instruct each sensor to operate in an interrogator mode or a responder mode;
   wherein each sensor has radar circuitry for sending and receiving a continuous wave signal, such that it may send the signal to, and receive the signal back from a neighboring sensor, when the former sensor is in interrogator mode;
   wherein each sensor has delay circuitry for delaying and returning a signal received from a neighboring sensor, when the former sensor is in responder mode;
   wherein each sensor has control circuitry for determining whether the sensor is in interrogator or responder mode and for calculating phase difference measurements of the returned signal.

10. The method of claim 9, wherein each sensor has an omni-directional antenna.

11. The method of claim 9, wherein the known distances are known to within one-half of the wavelength of the continuous wave.

12. The method of claim 9, wherein the control unit of each sensor is further operable to transmit distance measurement data to the host computer.

13. The method of claim 9, wherein each sensor further has initialization circuitry for using a pulse burst radar process to determine the inter-sensor distances with an accuracy of less than the carrier wavelength.

14. The method of claim 9, wherein the host computer and sensors wirelessly communicate using a wireless LAN communications standard.

15. The method of claim 9, wherein the inter-sensor spacing is sufficiently close such that they are operational at 1 mW of power of less.

16. The method of claim 9, wherein the host computer and sensors are operational at a single carrier frequency.

* * * * *